March 1, 1949.  A. R. GOLDSBY  2,463,262
ALKYLATION METHOD AND APPARATUS
Filed May 9, 1945  2 Sheets-Sheet 1
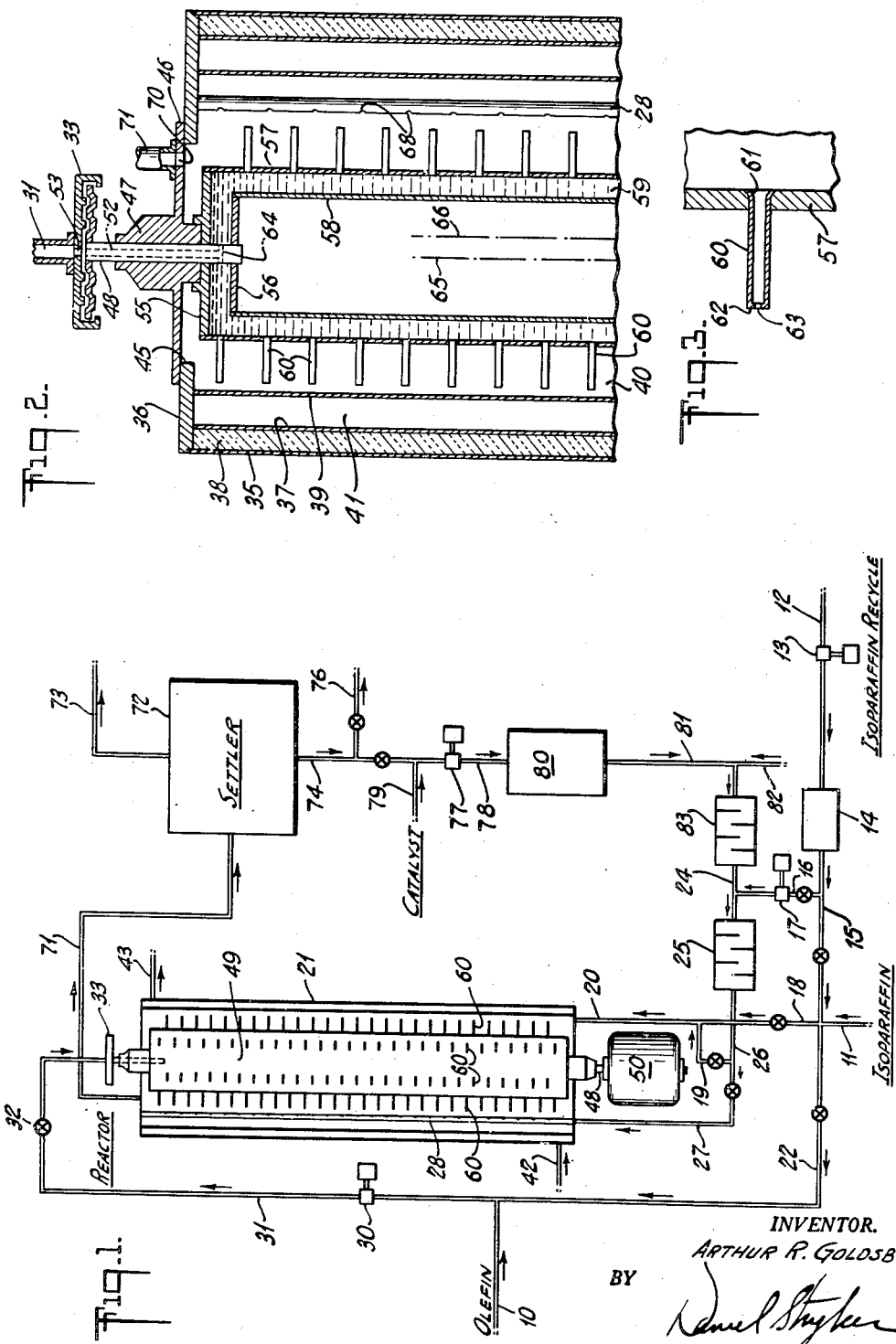
INVENTOR.
ARTHUR R. GOLDSBY.
BY
ATTORNEY.

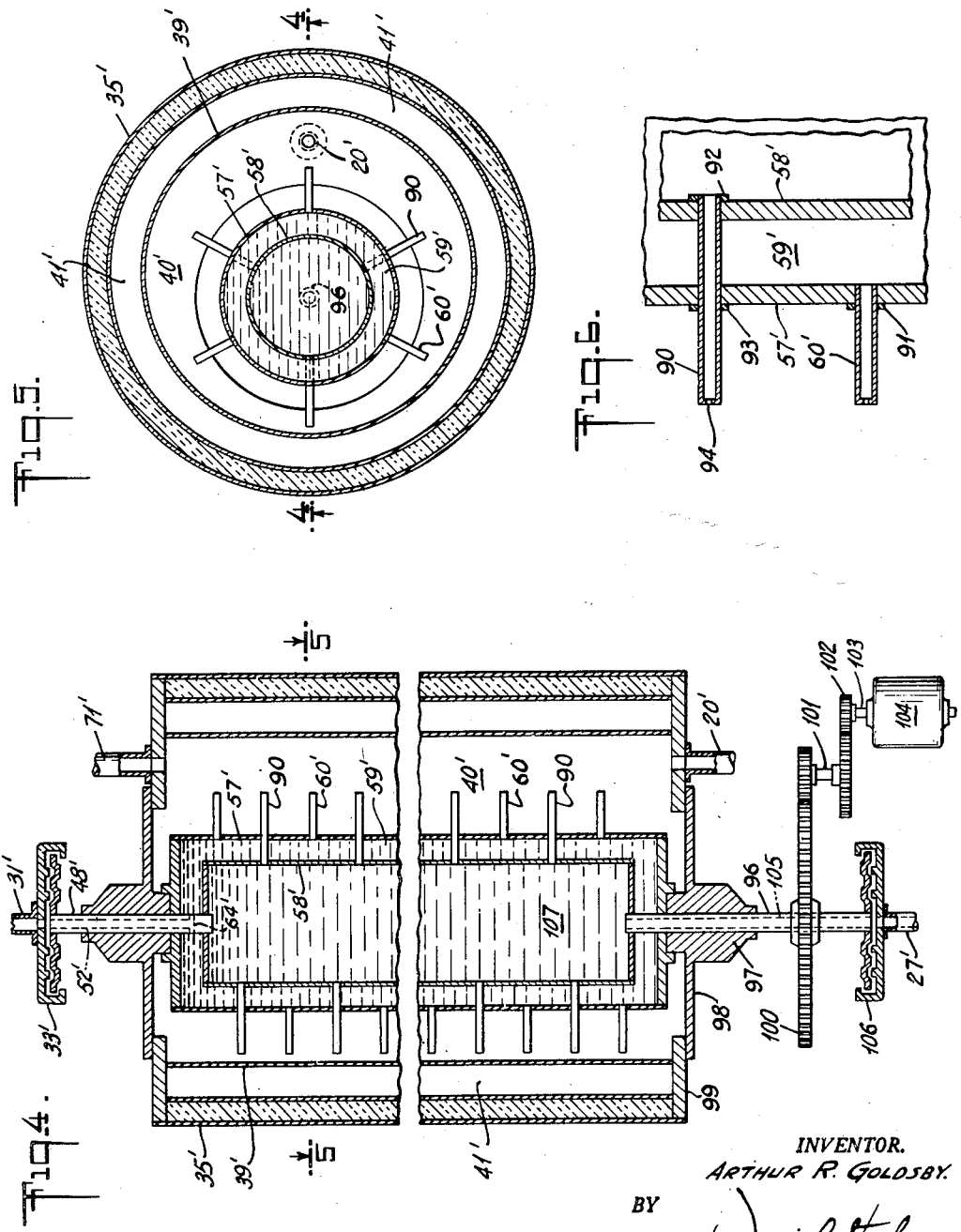

Patented Mar. 1, 1949

2,463,262

UNITED STATES PATENT OFFICE 2,463,262

ALKYLATION METHOD AND APPARATUS

Arthur R. Goldsby, Beacon, N. Y., assignor to Texaco Development Corporation, New York, N. Y., a corporation of Delaware Application May 9, 1945, Serial No. 592,752

13 Claims. (Cl. 260—683.4)

This invention relates to catalytic alkylation of an organic compound having a replaceable hydrogen atom with an alkylating agent, and more particularly of a paraffin having a tertiary carbon atom, such as isobutane, with an olefin, for the production of gasoline hydrocarbons of high antiknock value suitable for aviation gasoline and motor fuel.

One of the principal objects of the invention is to improve the conventional catalytic alkylation process, to enable a superior quality of alkylate to be produced without sacrifice in capacity, or to provide increased capacity of alkylate of the same quality, and also to improve catalyst life.

Another object of the invention is to provide an improved method of effecting multipoint addition of olefin or other alkylating agent at regions of highly efficient mechanical agitation of the reaction mix in a catalytic alkylation process of this character.

A further object of the invention is to provide for the successive replenishment in the direction of flow of the reaction mix through the catalytic alkylation reaction zone of liquid alkylation catalyst saturated with low-boiling isoparaffin or other organic compound having a replaceable hydrogen atom, in conjunction with multiple feed of olefin or other alkylating agent at spaced points along the length of said zone, to thereby improve the selectivity of the alkylation reaction and minimize undesired side reactions.

Still another object of the present invention is to provide improved apparatus for carrying out the foregoing methods.

Other objects and advantages of the present invention will be apparent from the following description when taken in conjunction with the attached drawing and appended claims.

The copending application of Arthur R. Goldsby and Claude W. Watson, Serial No. 476,896, filed February 24, 1943, and now Patent No. 2,454,869, discloses and claims so-called multipoint olefin feed in an alkylation reactor to avoid local accumulation of olefin in the liquid alkylation catalyst. This involves the introduction of the olefin or other alkylating agent into the agitated or circulating stream of hydrocarbon and catalyst in finely divided form and at a large number of spaced points extending throughout a substantial proportion of the volume of the mechanically agitated mix. By combining the feature of fine sub-division of the olefin with the finite spacing of the substantial number of points of olefin introduction, so as to prevent any substantial accumulation or build-up of olefin in any increment of the acid in the reaction mixture, local overheating and alkyl ester build-up in the acid catalyst are prevented, and objectionable side reactions of the olefin with itself or with the catalyst are minimized.

Various forms of reactors, such as the pump and time tank reactor, jet type reactor, and impeller type of mixer such as the Stratco reactor, are used commercially in these catalytic alkylation processes. It has also been proposed to employ for catalytic alkylation a reactor of the so-called Votator type, involving a rotary agitating cylinder carrying a plurality of projecting pins and mounted eccentrically within a cylindrical tank, and wherein the olefin is introduced at one or a small number of fixed points along a portion of the length of the cylindrical tank.

In accordance with the present invention, apparatus of a modified Votator type is provided wherein the olefin or other alkylating agent is dispersed by multipoint addition from all or a large number of hollow pins or fingers of the eccentrically mounted rotary cylinder which rotates at high speed. In this manner, the olefin is dispersed by centrifugal force from a large number of spaced small jets moving through the reaction mix in circular paths of substantial diameter at high linear velocity eccentrically of the circular cross section of the reaction zone, and in the immediate regions of high mechanical agitation. There is thus afforded an economical and highly effective way of distributing the olefin by multipoint addition throughout a very substantial extent of the reaction zone, and at the same time insuring that the reaction mix in the immediate vicinity of all the points of olefin dispersion is subjected to highly efficient mechanical agitation or mixing action. The local concentration of olefin can thereby be kept lower than has heretofore been feasible.

As a further feature of the present invention, liquid alkylation catalyst intimately mixed or saturated with the low-boiling isoparaffin, or other organic compound having a replaceable hydrogen atom, is introduced into the reaction mix at a plurality of spaced points along the length of the reaction zone. While the injection of additional alkylation acid at spaced points along a coil reactor has heretofore been proposed, this does not accomplish the objectives of the present invention. It is postulated that the alkylation reaction takes place between isobutane dissolved in the acid and olefin at the acid-hydrocarbon interface. It is believed that the failure of prior alkylation equipment to prevent some objectionable side reactions resulting in deterioration of product quality and reduced catalyst life has been largely due to practical mechanical limitations on the efficiency of agitation and mixing necessary to maintain isobutane dissolved in the acid, uniformly throughout the reaction zone, and to maintain the required equilibrium between isobutane in the acid phase and isobutane in the hydrocarbon phase. The present invention overcomes these mechanical difficulties by introducing additional alkylation catalyst saturated with isobutane throughout the length of the reaction space where olefin is introduced, so that the required amount of isobutane in solution in the acid catalyst is insured. Preferably, the isobutane-saturated catalyst is introduced by multipoint addition at spaced points along the reaction zone which are arranged alternately or in staggered relationship with the points of olefin introduction.

As another feature of the present invention, a reactor of a modified Votator type is provided wherein the eccentrically mounted rotor is constructed of concentric cylinders, each equipped with a plurality of hollow pins or fingers extending into the reaction space to provide efficient agitation, and wherein the alkylation catalyst saturated with the isoparaffin is introduced into the interior cylinder to be distributed by centrifugal force from the hollow pins communicating with the interior of that cylinder, and the olefin or other alkylating agent is supplied to the annular space between the cylinders so as to be distributed by centrifugal force from the respective hollow pins communicating with the space within said outer cylinder. This provides highly efficient dispersion of both the olefin and the catalyst saturated with isobutane, resulting in desired fineness of particle size, and frequent renewal of the surface of the dispersed phase, which factors promote the desired selectivity of the alkylation reaction and minimize undesired side reactions. Moreover, the required amount of isobutane is continuously maintained in solution in the acid catalyst throughout the region of initial contact and reaction of the olefin therewith; and the frequency of surface renewal is instrumental in removing alkylation reaction product from the acid phase, thereby minimizing deterioration and degradation of product.

The invention is illustrated by way of example as applied to sulfuric acid alkylation of a low-boiling isoparaffin, such as isobutane, with an olefin, such as a butylene. Conventional operating conditions for that process which can be employed are overall isobutane : olefin mol feed ratios of about 3:1 to 10:1 and preferably at least 5:1, with acid in the reactor having a titratable acidity of about 88–95%, an acid to hydrocarbon volume ratio of at least about 1:1, and a temperature of 30–60° F. and preferably about 40–50° F. The uncombined $H_2O$ concentration of the acid in the reactor system is maintained below about 2% and preferably below 1%. Preferably, this is accomplished by prechilling the recycle acid, and fortifying the prechilled acid with $SO_3$ or fuming acid in controlled amount in accordance with the water content to thereby reduce the percentage of water in the system acid and maintain it at a desired low figure. The prechilled and fortified recycle acid is then intimately mixed with isobutane to insure saturation of the acid with this isoparaffin. A portion of the mixture may then be introduced into the long closed reaction zone adjacent the inlet end thereof; and the balance of the isobutane-saturated acid is introduced by multipoint addition at spaced points along the length of the reaction zone. Where the concentric cylinder construction of modified Votator reactor is employed, the prechilled acid saturated with isobutane is brought into heat exchange relationship with the olefin or alkylating agent immediately prior to dispersion of these liquids into the reaction mix. This cooperates with the surrounding refrigerating jacket of the reaction zone to avoid local overheating of any portion of the reaction mix, and maintains the desired temperature in the reaction zone.

In the drawing, which discloses preferred embodiments of the invention:

Fig. 1 is a diagrammatic view, with the reactor in vertical section, of alkylation apparatus constructed in accordance with the present invention;

Fig. 2 is an enlarged partial vertical sectional view of the reactor of Fig. 1;

Fig. 3 is a detail sectional view illustrating the construction of the hollow fingers carried by the rotary cylinder of Figs. 1 and 2;

Fig. 4 is a vertical sectional view taken on the plane of the line 4—4 of Fig. 5, illustrating a modified reactor having a rotor of the double concentric cylinder type;

Fig. 5 is a horizontal sectional view taken on the plane of the line 5—5 of Fig. 4; and Fig. 6 is a detail sectional view illustrating the construction of the hollow fingers of Figs. 4 and 5.

Referring to Fig. 1, the olefin feed is introduced by line 10, and the isoparaffin fresh feed by line 11. It will be understood that the main supply of the isoparaffin is that recycled from the alkylate fractionating system by line 12 containing pump 13. This recycle isoparaffin may be passed through a cooler or chiller 14, and the prechilled isoparaffin then divided between valve-controlled lines 15 and 16, the latter containing pump 17. Preferably, the major proportion of the isoparaffin passes by line 15 to mix with the fresh feed from line 11, the combined isoparaffin then flowing by valve-controlled line 18 together with a proportion of alkylation catalyst from valve-controlled line 19, and the mixture being introduced by line 20 into the lower end of the reaction space of the reactor indicated generally at 21. A minor proportion of the isoparaffin can be supplied by valve-controlled line 22 to be mixed with the fresh olefin feed from line 10 to thereby adjust the isoparaffin : olefin mol ratio to about 1:1 or somewhat higher.

Sufficient isoparaffin is diverted by line 16 so as to saturate the recycle alkylation catalyst or acid passing through line 24. This mixing and saturating action is facilitated by mixer 25. The acid saturated with isoparaffin, preferably isobutane, then passes by line 26, and is divided between valve-controlled line 19 mentioned above and valve-controlled line 27, the latter communicating with perforate pipe 28 extending throughout the length of the reaction zone of reactor 21. Sufficient acid saturated with isobutane is mixed by line 19 with the bulk of the isoparaffin from line 18 to provide the desired acid to hydrocarbon ratio within the reaction zone, such as about a 1:1 volume ratio. The balance of the isoparaffin-saturated acid is passed by line 27 to the perforate pipe 28 where it is distributed at spaced points along the length of the reaction zone as hereinafter described in greater detail. The olefin feed from line 10, mixed with any isoparaffin from line 22, is passed by pump 30 through line 31 controlled by valve 32 to floating connection 33 from where it is fed through the hollow shaft of the rotary cylinder to be distributed by multipoint addition throughout the reaction zone as hereinafter described.

The construction of reactor 21 is illustrated in greater detail in Fig. 2. As shown, the reactor comprises an outer cylindrical shell 35 carried by opposed end plates 36. Spaced from shell 35 is a second metal shell 37 forming an annular space which is filled with heat insulating packing 38. Spaced from shell 37 is an inner shell 39 confining the reaction space 40, and forming an annular chamber 41 between shells 37 and 39 which is supplied by refrigerant from line 42, the latter being discharged by line 43.

The opposed heads 36 are formed with aligned circular openings 45 over which are bolted bearing plates 46 carrying the bearings 47 for stub shafts 48 of the rotary dispersion and agitating member indicated generally in Fig. 1 by numeral 49. The lower shaft 48 is directly connected to driving motor 50 to be rotated at high speed. The upper shaft 48 is drilled to provide an axial olefin feed channel 52 communicating with the feed pipe 31 through a drilled hole 53 in the outer stationary member of the floating connection 33.

Each shaft 48 is fastened to two spaced heads 55 and 56. Both pairs of heads 55 and 56 at opposite ends of the rotor 49 form end plates to which are fastened outer and inner concentric shells 57 and 58 respectively. An annular channel 59 is thus formed between the cylindrical shells, to which the olefin is supplied from bore 52 by drilled radial openings 64 extending outwardly from the bore 52 through the shaft and opening into the space 59 between the said cylinders 57 and 58.

The outer cylinder 57 carries a plurality of outwardly protruding pins or fingers 60. As shown more particularly in Fig. 1, there are a plurality of longitudinal rows of pins, the separate rows being spaced equally about the periphery of the cylinder. Ordinarily, about six rows spaced about 60 angular degrees apart about the periphery of the cylinder will be provided, although this number and spacing can be varied. However, it is preferred to have at least three rows; and not much advantage is gained by having more than eight rows. Also, the pins or fingers of one row are staggered lengthwise of the rotor with respect to the pins of an adjacent row, as illustrated in Fig. 1. For example, the spacing between the center lines of two adjacent pins of one row may be such that the staggered pins of the remaining rows about the periphery of the cylinder will provide positive mechanical agitation or stirring action throughout the entire volume of the reaction space between the peripheries of the pins and the exterior of the cylinder 57.

As shown more particularly in Fig. 3, certain or all of the pins 60 are hollow and may be formed of sheet tubing, the inner end of which is swaged or otherwise secured at 61 within a circular drilled opening through the cylinder 57. The outer end of the pin is provided with an inwardly extending tip 62 forming a small orifice or jet indicated at 63. If preferred, a small jet insert can be fastened within the outer end of the hollow pin 60 to provide a nozzle effect. The orifice or jet 63 is of sufficient size to avoid plugging, while still affording the desired fineness of dispersion, and enabling the required amount of charge to be introduced for a given pressure drop. For this purpose, the jet 63 has a diameter of less than ¼" and generally greater than 1/16", preferably about ⅛". While all the pins 60 can be constructed as shown in Fig. 3, this is not essential; and a number of the pins can be solid or have closed outer ends to provide merely stirring action without olefin injection. Where only certain of the pins are constructed for olefin injection, these are preferably staggered about the periphery of the cylinder and also spaced longitudinally thereof, so that the olefin is fed more or less uniformly throughout the length of the reaction zone.

As shown more particularly in Fig. 2, the axial center line 65 of shafts 48 is offset from the longitudinal axis 66 of the cylinder 39. The resultant eccentric mounting of the rotor assembly within the cylindrical casing 39 provides an annular reaction space of progressively changing cross-section between the rotor and the casing 39. The exterior diameter of the cylinder 57 is coordinated with the interior diameter of casing 39 to provide an annular reaction space of sufficiently small volume that the heat of reaction can be effectively extracted from the reaction mix by the surrounding refrigerating jacket 41, as aided by the efficient mechanical mixing. The pins 60 have a substantial length of the order of about 2–4 inches for a cylinder having a diameter of about 6–15 inches. Due to the eccentric mounting of the cylinder, rotation of the reaction mix within the casing is effectively restrained. Consequently, the pins 60, during the rapid rotation of the rotor, provide a highly efficient stirring action through the reaction mix. As shown, the outer ends of the pins closely approach the interior wall of casing 39 at one side of the shell, such for example as a distance of ¼–1 inch, and are spaced a substantially greater distance from the shell at the diametrically opposite side, where the pipe 28 may be mounted. The rotor is driven by motor 50 at a speed to provide a peripheral velocity of the jets 63 through the reaction mix of the order of about 5–50 feet per second and preferably about 15–30 feet per second. This is accomplished by driving the rotor at about 15–1800 R. P. M., depending on the diameter of the cylinder 57 and the length of the pins 60. In any event, it will be seen that the hollow pins 60 provide jets for olefin dispersion which move through the reaction mix at high linear velocity and in circular paths of substantial diameter which are eccentric to the reaction zone. The resulting centrifugal force, coupled with the rapid movement of the jets through the reaction zone, effects a fine dispersion of the olefin feed into the reaction mix at the immediate region of highly efficient mechanical agitation.

In operation, the reaction zone is maintained under sufficient pressure to keep the hydrocarbons in liquid phase and to counteract any undue centrifugal force of the rapidly rotating jets, whereby the rate of olefin feed can be regulated by adjustment of valve 32 to provide a pressure drop across the jet 63 of the order of about 2–15 pounds and preferably about 5–10 pounds. This coupled with the centrifugal force produces a positive jetting action of the olefin feed into the reaction mix, which further contributes to the effectiveness of the dispersion. The bulk of the fresh feed and recycle isoparaffin is ordinarily supplied to the inlet end of the reactor by line 20. For example, about 90% of the isoparaffin may be supplied by the line 20, and about 10% by the line 27. The mixture of isobutane and alkylation catalyst, such as sulfuric acid, supplied to the inlet end of the reactor by line 20 is adjusted to give a desired acid to hydrocarbon volume ratio of the order of about 0.8:1 to 2:1 or somewhat higher, and provide an isobutane concentration in the hydrocarbon phase of the reaction mix of the order of about 40–70% by volume and preferably around 50–60% by volume.

The olefin jetted into the reaction mix through the rotary hollow pins 60 throughout the length of the reaction zone tends to alter the initial acid to hydrocarbon volume ratio by progressively decreasing the same, and tends also to progressively reduce the isobutane concentration in the hydrocarbon phase of the reaction mix along the length of the reaction zone. These tendencies are counteracted by the introduction of acid saturated with isobutane through the perforations 68 in pipe 28, which are spaced throughout the length of the reaction zone and preferably face toward the rotor and ends of pins 60 to jet this mixture into or closely adjacent to the region of positive stirring action of the pins. The amount of isobutane-saturated acid is controlled to maintain a desired isobutane concentration in the hydrocarbon phase throughout the length of the reaction zone, which concentration may remain substantially uniform or may even increase somewhat from the inlet to the outlet. Likewise, the amount of acid introduced from the jets of pipe 28 can be sufficient to substantially maintain a uniform acid to hydrocarbon volume ratio throughout the reaction zone, or this ratio may be progressively increased from the inlet to the outlet. For example, the inlet acid to hydrocarbon volume ratio may be about 1:1, and this may be progressively increased to a ratio of about 1.5:1 or somewhat higher adjacent the upper outlet end of the reactor. It will be seen that the jets 68 insure the presence of isobutane in solution in the acid catalyst in the immediate regions of olefin dispersion from pins 60 throughout the length of the reaction zone, and thereby promote the selectivity of the alkylation reaction.

Reaction products overflow in accordance with the feed rate from the outlet port 70 formed in bearing plate 46, and pass through pipe 71 to a settler 72. In the latter, the emulsion separates into an upper hydrocarbon layer which is removed by pipe 73 to suitable neutralizing, washing and fractionating equipment in conventional manner, and a lower acid layer removed by line 74. It will be understood that the excess isoparaffin, such as isobutane, is recovered in the alkylate stabilization and fractionation system, and is recycled to the unit by line 12. A minor proportion of the settled acid may be discharged to recovery by valve-controlled line 76, and the major proportion is passed by pump 77 through valve-controlled line 78 together with fresh make-up catalyst from line 79.

Where strong sulphuric acid is employed as the alkylation catalyst, it is desirable to maintain the water content of this acid catalyst below about 2% and preferably below about 1% by weight. This may be accomplished by the method disclosed and claimed in the copending application of Arthur R. Goldsby and Claude W. Watson, Serial No. 574,137, filed January 23, 1945 and now Patent No. 2,437,091. In this method, the recycle acid is passed through a chiller 80 where the temperature is lowered to about 20° F. The chilled acid then flows through line 81 where it is mixed with a stream of $SO_3$ or fuming acid from line 82, the amount of free $SO_3$ being proportioned in accordance with the water content of the acid so that the resulting mixture, after passing through mixer 83, is devoid of any excess free $SO_3$. The prechilling of the acid prevents a temperature rise of the fortified acid above about 40° F., thereby avoiding deterioration of the acid which would result from reaction of free $SO_3$ on carbonaceous material of the acid at higher temperatures. The recycle of fortified acid of resulting low water content below about 0.5% continuously maintains the system acid in reactor 21 at the desired low water content below 2% and preferably below about 1%. The fortified acid emerging from mixer 83 then passes by line 24 together with isobutane from line 16 to mixer 25 for presaturation, and the resulting isobutane-saturated acid then passes to the reactor system in the manner previously described. The prechilling of the recycle acid in chiller 80 coupled with the prechilling of the isoparaffin recycle in chiller 14 facilitates the saturation of the acid with isobutane, since the solubility of isobutane in sulfuric acid increases with a lowering of temperature.

Figs. 4 and 5 disclose a modification of the reactor which can be employed in the system of Fig. 1, wherein both the olefin and the catalyst saturated with the isoparaffin or other organic compound having a replaceable hydrogen atom are dispersed into the reaction mix from hollow fingers carried by the eccentrically mounted rotor. In these figures, primed reference numerals are used to designate similar parts of elements which are identical in construction with those of Fig. 2.

In this embodiment, the outer rotary cylinder 57' is provided with a series of rows of hollow pins or fingers 60', and the inner cylinder 58' is also provided with a series of rows of pins 90 arranged alternately with the pins 60'. The detailed construction is illustrated more particularly in Fig. 6, where the pin 60' is shown sealed in place in the cylindrical shell 57' by means of a sealing plate 91 which may be spot-welded in position. The hollow pin 60' thus communicates with the annular space 59' between the cylinders 57' and 58'. The hollow pin 90 is sealed in an opening through the inner cylinder 58' by sealing plate 92, thus communicating with the interior of the inner cylinder 58'. The pin 90 extends through a suitable aligned opening in the outer cylinder 57', and is sealed therein by plate 93. As shown, the pins 90 preferably extend outwardly the same distance as the pins 60', and are formed with small ports or jets 94 in the same manner as pins 60'.

The olefin feed line 31' communicates through floating connection 33' with the bore 52' formed within upper shaft 48', said bore in turn communicating with ports 64' opening into the annular space 59' between the cylinders 57' and 58'. The olefin is thus fed to and dispersed by the hollow pins 60' in the manner previously described in connection with Fig. 2.

The lower shaft 96 mounted in bearing 97 carried by bearing plate 98 which is bolted to the lower end plate 99 of the reactor, is pinned to the lower end plates of the rotary cylinders 57' and 58' within the reactor. This shaft also has pinned thereto on the exterior of the reactor a driven gear 100 meshing with a suitable speed reducing and speed changing gearing indicated generally at 101. The latter is driven by pinion 102 mounted on the drive shaft 103 of motor 104. Shaft 96 has drilled completely therethrough an axial bore 105, the outer end of which communicates with pipe 27' through floating connection 106, and the inner end opening into the space 107 within the inner cylinder 58'. In this manner, acid saturated with isobutane is supplied from pipe 27' to the interior of inner cylinder 58' from where it is dispersed through the hollow pins 90 and jetted into the reaction mix flowing through the reaction space 40'.

As shown more particularly in Fig. 4, the pins 60' and 90 may be arranged alternately in each row along the length of the rotor. Likewise, as shown in Fig. 5, the pins 60' and 90 may be alternated about the periphery of the rotor adjacent to any particular cross section thereof. Here again, the pins of one row are preferably offset slightly from the pins of other rows, with the spacing between two adjacent pins of any row being such that positive mechanical agitation of the entire space between the pins on the exterior of cylinder 57' is secured on each rotation. While all of the pins can be hollow and provided with dispersing jets, this is not essential and only certain of the pins need be constructed for dispersing the olefin and isobutane-saturated acid into the reaction mix. In any event, it is desired that both the olefin and acid saturated with isobutane be dispersed at a plurality of spaced points along the greater portion of the length of the rotor. Also, it is preferred to have an acid dispersing pin located to discharge into any increment of the stream of reaction mix just prior to the discharge from an adjacent olefin dispersing pin into said increment as the stream moves progressively through the reaction zone 40' from the inlet 20' to the outlet 71'.

In the reactor of Fig. 2, the inner cylinder 58 can be omitted. However, the construction shown is desirable to reduce the volume filled with liquid and thereby reduce the weight of the rotating parts. In the reactor of Figs. 4 and 5, the olefin feed can be supplied to the inner cylinder, and the isobutane-saturated acid supplied to the annular space between the rotary cylinders. However, the construction shown is preferred, since that places the higher density liquid closer to the center of the rotor, and facilitates the balancing of the rotor. It will be understood that the respective rates of feed of olefin and isobutane-saturated acid from the hollow pins of Figs. 4 and 5 can be readily controlled by proper adjustment of the pressures at which the two liquids are supplied to their respective spaces within the rotor, whereby the pressure drop through the orifices of the pins 90 and 60' respectively is varied and maintained in a desired relationship. While hollow pins have been particularly disclosed and described, it will be understood that any suitable protuberances or projections can be formed on the rotary cylinder or cylinders to provide the desired stirring action and agitation, any number or all of said projections being equipped with said passages and jets for the dispersion of the liquids into the reaction mix in the manner described. It will be understood that the term "fingers" as used hereinafter throughout the description and claims refers to any of the foregoing types of protuberances or projections, of which hollow pins merely constitute a preferred example. While the reactors are shown as arranged vertically, it is to be understood that they may be horizontal or inclined.

The present invention is particularly applicable to the alkylation of isobutane with $C_3$, $C_4$, or $C_5$ olefins, or mixtures thereof, for the production of aviation gasoline of high octane and quality. However, it is to be understood that the invention is applicable to the alkylation of any low-boiling isoparaffin with any normally gaseous or normally liquid olefin. Thus, the isoparaffin may be isobutane, isopentane or isohexane. The olefin may be ethylene, propylene, butylenes, pentylenes, hexylenes, other higher boiling monomeric olefins or certain selected fractions of cracked naphthas, olefin polymers such as di-isobutylene, tri-isobutylene, cross-polymers of isobutylene and normal butylene such as codimer, and various mixed or non-selective polymers.

While the present invention has been described above as applying particularly to the use of sulfuric acid as the catalyst, it is to be understood that any other suitable and conventional alkylation catalyst can be employed, such as hydrofluoric acid, aluminum chloride-hydrocarbon complex, $BF_3.H_2O$, chlorosulfonic acid, fluosulfonic acid and the like. The operating conditions for these catalysts are well-known, and conventional conditions coupled with the features of the present invention as set forth above may be used.

Moreover, the present invention is applicable to the alkylation of any organic compound having a readily replaceable hydrogen atom with any suitable alkylating agent. As stated above, the invention is of particular importance in the alkylation of an isoparaffin or other paraffin hydrocarbon having a tertiary carbon atom in the molecule, to enable a superior quality of aviation alkylate to be produced in large capacity. But the principles of the present invention are applicable to the alkylation of a normal paraffin, a naphthene or cycloparaffin, and an aromatic hydrocarbon, in place of the isoparaffin. The expression "organic compound having a replaceable hydrogen atom" is used herein throughout the description and claims to designate the various types of compounds mentioned above which can be alkylated with an olefin or other suitable alkylating agent. In place of an olefin as the alkylating agent, various alkyl esters, such as the sulfates, chlorides, fluorides, etc. may be used. For example, the present invention can be employed in a two-stage absorption-alkylation process, wherein the olefin is absorbed in acid in the first stage to produce the corresponding alkyl ester, and the ester either in solution in the absorbing acid or after separation therefrom as by isobutane or alkylate extraction, is then alkylated in the second stage in accordance with the present invention. Moreover, various aliphatic alcohols and ethers which are capable of forming olefins on reaction, such as tertiary butyl alcohol, isopropyl alcohol, buty ether, etc. may be employed as the alkylating agent, particularly with catalysts which have tolerance for water liberated in the reaction. The expression "alkylating agent" is used herein throughout the description and claims to denote any of the above compounds which react with the isoparaffin or other organic compound having a replaceable hydrogen atom in this alkylation reaction to produce alkylated hydrocarbons.

The following example is given as illustrative of the present invention. A modified Votator reactor of the type shown in Fig. 2 is provided with a cylindrical casing having a length of about 12 feet with an overall diameter of 36 inches, and a reaction space having an internal diameter of 24 inches. Mounted within this reactor casing is a cylindrical rotor having an overall diameter of 11 inches, said rotor being equipped with six rows of pins, each having a length of 3½ inches from the surface of the cylindrical rotor to the end of the pin and having an overall diameter of ⅝ inch, the pins of the row being spaced with center lines 4 inches apart. The eccentricity of the rotor with respect to the axis of the cylindrical casing is 2½ inches, so that the outer ends of the pins at their closest approach to the casing are ½ inch from the interior wall, and are 5½ inches from the casing at the diametrically opposite side. Every third pin of each row is drilled and equipped with a ⅛ inch orifice for olefin discharge, providing a total of 72 olefin discharge pins evenly spaced throughout the length of the reactor, the olefin feed pins of one row being staggered with respect to another. Operating the rotor at 200 R. P. M., a peripheral linear velocity of the olefin discharge jets of about 15 feet per second is obtained. The isobutane-saturated acid feed pipe 28 is equipped with 72 ports or jets equally spaced throughout the length of the reactor and facing toward the rotor and pins, with the jets located about 1 inch from the periphery of the pins at their closest approach. Each jet of pipe 28 is arranged slightly below a cooperating dispersion pin, so that any increment of the reaction mix alternately receives first the dispersed acid saturated with isobutane and then the dispersed olefin, as said increment moves progressively through the reactor from the inlet to the outlet. Using a total $C_4$ olefin feed containing roughly about 30% butylenes, 30% isobutane and 40% normal butane, with an overall isobutane to butylene feed ratio of about 5:1, a reaction temperature of 45° F., an acid to hydrocarbon volume ratio varying from about 1:1 at the inlet of the reactor to about 1.3:1 at the outlet, and utilizing 99% makeup $H_2SO_4$ with $SO_3$ fortification to maintain a titratable acidity within the reaction zone of about 92–93% with a water content below 1%, a total debutanized alkylate is obtained having a clear CFRM octane of 94.3, of which 96% boils within the aviation gasoline range below 350° F., and with a catalyst life of better than 25 volumes of alkylate per volume of $H_2SO_4$.

Obviously many modifications and variations of the invention, as hereinbefore set forth, may be made without departing from the spirit and scope thereof, and therefore only such limitations should be imposed as are indicated in the appended claims.

I claim:

1. In the catalytic alkylation of an organic compound having a replaceable hydrogen atom with an alkylating agent in the presence of a liquid alkylation catalyst, wherein the organic compound is introduced in liquid phase along with liquid alkylation catalyst adjacent one end of a long closed agitated reaction zone containing the reaction mix, and through which zone the reaction mix flows progressively from said one end to the opposite end thereof, and the alkylating agent is introduced into the reaction mix at a plurality of spaced points along the length of said zone, the improvement which comprises introducing additional liquid alkylation catalyst previously saturated with the organic compound in liquid phase into the reaction mix separately from said alkylating agent at a plurality of spaced points along the length of said zone, while moving both series of spaced points relative to the reaction zone generally across the direction of progressive flow of the reaction mix.

2. Alkylation apparatus of the character described, comprising a long cylindrical tank, a relatively large diameter rotary cylinder mounted therein eccentrically of said cylindrical tank providing a reaction space therebetween, a series of protruding agitating fingers carried by said rotary cylinder at spaced points along the length thereof and having a length to closely approach the interior wall of said cylindrical tank at one side of the latter, at least a substantial number of said fingers being hollow, said cylinder being formed with an interior passage communicating with said hollow fingers, means for supplying liquid alkylation catalyst and organic compound containing a replaceable hydrogen atom to the reaction space within said cylindrical tank, means for supplying an alkylating agent to said interior passage of said cylinder, and means for rotating said cylinder at high speed, whereby the alkylating agent is dispersed by centrifugal force from said hollow fingers into said reaction space at a plurality of points spaced along the length thereof.

3. Alkylation apparatus in accordance with claim 2, wherein said catalyst and organic compound supply means includes a feed pipe opening into said cylindrical tank adjacent one end thereof, a discharge pipe for reaction products from the opposite end of said tank, and a concentric cylinder of smaller diameter mounted within and rotatable with said rotary cylinder forming an annular passage for alkylating agent communicating with said hollow fingers.

4. Alkylation apparatus in accordance with claim 2, including means for introducing additional alkylation catalyst mixed with said organic compound into said reaction space at a plurality of spaced points along the length thereof.

5. Alkylation apparatus of the character described, comprising a long cylindrical tank, a rotary agitating and dispersion member mounted therein eccentrically of said cylindrical tank providing a reaction space therebetween, said member comprising an outer hollow cylinder and an inner concentric hollow cylinder spaced from the outer cylinder and forming an annular passage therebetween, a plurality of protruding agitating fingers carried by said outer cylinder on the exterior thereof, a substantial number of said fingers at spaced points along the length of said cylinder being hollow and communicating with said annular passage, an additional series of spaced hollow fingers carried by said inner cylinder and providing communication with the space within said inner cylinder, said last-mentioned fingers extending through said outer cylinder and terminating in the reaction space within said cylindrical tank, means for supplying liquid alkylation catalyst and organic compound containing a replaceable hydrogen atom to the interior of said inner cylinder, means for supplying alkylating agent to the annular space between said inner and outer cylinders, and means for rotating said cylinders at high speed, whereby the mixed alkylation catalyst and organic compound and the alkylating agent are dispersed by centrifugal force into the reaction space at spaced points along the length thereof.

6. Alkylation apparatus in accordance with claim 5, wherein the hollow fingers carried by the inner cylinder are staggered with respect to the hollow fingers carried by the outer cylinder.

7. Alkylation apparatus in accordance with claim 5, wherein the said fingers all terminate at substantially the same distance from the axis of rotation of said cylinders, the eccentric mounting of said cylinders with respect to said cylindrical tank and the length of said fingers being such that the fingers closely approach the wall of the cylindrical tank at one point in their rotary movement, there being a series of rows of fingers protruding from the cylinders around the circumference thereof, with the fingers communicating with the interior of the inner cylinder being staggered with respect to fingers communicating with the annular space between said cylinders for alternate jetting of the alkylating agent and the alkylation catalyst mixed with organic compound throughout a substantial proportion of the length of said reaction space.

8. In the alkylation of a low boiling isoparaffin in liquid phase with an alkylating agent in the presence of a liquid alkylation catalyst in a long closed agitated reaction zone, wherein liquid alkylation catalyst together with low boiling isoparaffin are introduced adjacent one end of the long closed reaction zone and while being agitated flow progressively from said end to the opposite discharge end thereof, and alkylating agent is introduced into the reaction mix by multipoint addition from a large number of points spaced throughout the greater part of the length of said reaction zone, the improvement which comprises introducing additional liquid alkylation catalyst premixed with said low boiling isoparaffin by multipoint addition at a large number of points spaced intermediate and alternating with said alkylating agent introduction points in the direction of progressive flow and also spaced throughout the greater part of the length of said reaction zone.

9. In the catalytic alkylation of an organic compound having a replaceable hydrogen atom with an alkylating agent in the presence of a liquid alkylation catalyst, wherein the organic compound is introduced in liquid phase along with liquid alkylation catalyst adjacent one end of a long closed agitated reaction zone containing the reaction mix, and through which zone the reaction mix flows progressively from said one end to the opposite end thereof, and the alkylating agent is introduced into the reaction mix from a large number of spaced small jets extending throughout a substantial portion of the length of the reaction zone, the improvement which comprises introducing additional liquid alkylation catalyst saturated with the organic compound from a large number of spaced small jets alternating with the alkylating agent jets, while moving both series of jets through the reaction mix in circular paths of substantial diameter at high linear velocity.

10. In the catalytic alkylation of an organic compound having a replaceable hydrogen atom with an alkylating agent in the presence of a liquid alkylation catalyst, wherein alkylation catalyst and organic compound are continuously introduced adjacent one end of a long close reaction zone for continuous progressive flow therethrough, the alkylating agent is introduced at a plurality of spaced points along the length of said zone, and reaction products are discharged from the opposite end of said reaction zone to a settling zone where liquid catalyst is separated, the improvement which comprises removing a stream of settled catalyst, prechilling the removed stream, mixing the prechilled stream with organic compound having a replaceable hydrogen atom, and dispersing the prechilled mixed stream into the reaction mix from a plurality of small jets spaced throughout a substantial portion of the length of the reaction zone while moving the jets at high linear velocity through the reaction zone in spaced paths extending generally across the direction of continuous progressive flow through the reaction zone.

11. Alkylation apparatus of the character described, comprising a long cylindrical tank providing a reaction space, a rotary agitating and dispersion member mounted eccentrically therein, and extending throughout the major portion of the length of said tank, said member having a large number of feed orifices spaced from the axis of said rotary member and also spaced along the length of said rotary member throughout a major portion of the length of said cylindrical tank, said rotary member being formed with an interior passage communicating with said feed orifices, means including an inlet adjacent one end of said tank for supplying liquid alkylation catalyst and organic compound having a replaceable hydrogen atom to one end of said reaction space to flow progressively along the length of said tank to the opposite end thereof, an outlet for reaction products from adjacent said opposite end of the tank, means including an inlet for supplying an alkylating agent to said interior passage of said rotary member, the latter also being provided with a second set of feed orifices spaced from the axis thereof and also spaced along the length of said rotary member throughout a major portion of the length of said tank, said rotary member being formed with a second interior passage closed from communication with said first mentioned interior passage and communicating with said second set of feed orifices, means for introducing additional alkylation catalyst mixed with said organic compound into said second interior passage for dispersion from said second set of feed orifices, and means for rotating said rotary member at high speed whereby the said alkylating agent and the said alkylation catalyst mixed with organic compound are dispersed into said reaction space by centrifugal force from said sets of feed orifices moving in circular paths of substantial diameter at high peripheral speed eccentrically of said reaction space.

12. In the catalytic alkylation of an organic compound having a replaceable hydrogen atom with an alkylating agent in the presence of a liquid alkylation catalyst, wherein the organic compound is introduced in liquid phase along with liquid alkylation catalyst adjacent one end of a long closed agitated reaction zone containing the reaction mix, and through which zone the reaction mix flows progressively from said one end to the opposite end thereof, the improvement which comprises dispersing the alkylating agent into the reaction mix in finely-divided form from a large number of spaced points along the length of said zone, introducing additional liquid alkylation catalyst saturated with the organic compound in liquid phase into the reaction mix separately from said alkylating agent by multipoint addition at a plurality of spaced points arranged alternately with and slightly ahead of the points of alkylating agent addition in the direction of progressive flow through the reaction zone, with both series of spaced points being moved in parallel paths generally across the direction of progressive flow through said reaction zone.

13. In the catalytic alkylation of an organic compound having a replaceable hydrogen atom with an alkylating agent in the presence of a liquid alkylation catalyst, wherein the organic compound is introduced in liquid phase along with liquid alkylation catalyst adjacent one end of a closed agitated reaction zone containing the reaction mix, and through which zone the reaction mix flows progressively from said one end to the opposite end thereof, and the alkylating agent is introduced into the reaction mix at a plurality of spaced points along the length of progressive flow through said zone, the improvement which comprises moving the said plurality of spaced points through the reaction mix in circular paths generally across the direction of progressive flow through the reaction zone, and introducing additional liquid alkylation catalyst previously saturated with the organic compound in liquid phase into the reaction mix at a plurality of zones spaced intermediate of and alternating with the spaced circular paths of alkylating agent addition along the length of said progressive flow, said last-mentioned zones also extending around the range of said circular paths in the reaction zone, so that the said additional saturated alkylation catalyst is widely distributed into the reaction mix around the reaction zone, as well as along the length of progressive flow therethrough.

ARTHUR R. GOLDSBY.

REFERENCES CITED

The following references are of record in the file of this patent:

UNITED STATES PATENTS

| Number | Name | Date |
|---|---|---|
| 1,500,845 | Plauson | July 8, 1924 |
| 2,242,845 | Blount | May 20, 1941 |
| 2,246,703 | Thiele et al. | June 24, 1941 |
| 2,379,368 | Matuszak | June 26, 1945 |
| 2,402,905 | Miller | June 25, 1946 |